METHOD FOR PRODUCING MONOCRYSTALLINE SEMICONDUCTOR LAYERS

Filed Nov. 29, 1961

United States Patent Office 3,160,522

Patented Dec. 8, 1964

3,160,522
METHOD FOR PRODUCING MONOCRYSTALLINE SEMICONDUCTOR LAYERS

Walter Heywang, Munich, and Günther Ziegler, Erlangen, Germany, assignors to Siemens & Halske Aktiengesellschaft, Munich and Berlin, Germany, a corporation of Germany Filed Nov. 29, 1961, Ser. No. 155,649
Claims priority, application Germany, Nov. 30, 1960, S 71,475
7 Claims. (Cl. 117—229)

Our invention relates to a method for the production of monocrystalline, particularly thin, semiconductor layers, by thermal dissociation of a gaseous compound of the semiconductor substance and precipitation of the semiconductor substance onto a plate-shaped carrier.

According to the known method for such production of semiconductor layers it was necessary to precipitate the semiconductor substance upon a monocrystalline carrier consisting of the same semiconductor material in order to obtain a likewise monocrystalline growth of the substance being precipitated.

It is among the objects of our invention to devise a method that permits precipitating monocrystalline semiconductor layers by the pyrolytic process upon carriers whose crystalline lattice structure differs from that of the semiconductor substance to be produced, such as upon carriers, for example consisting of quartz, ceramic or a metal.

According to an essential feature of our invention, the semiconductor substance is precipitated pyrolytically from a gaseous compound thereof, upon a carrier having a lattice structure or solid constitution different from that of the precipitating semiconductor substance, by limiting the precipitation to a narrow zone which is caused to travel relative to the plate-shaped carrier from one end toward the other under conditions at which the precipitate is in liquid state within that narrow zone. The width of the zone is preferably in the order of millimeters, for example, approximately 1 or 2 mm., and the thickness of the precipitated layer is smaller than its width, such at 0.5 mm., for example.

As mentioned, the carrier may consist of a plate or sheet of quartz or ceramic. The carrier may also consist of glass or other materials. If a metallic carrier is used, it may consist of tantalum, for example.

The semiconductor substance, such as silicon or germanium, is precipitated within the narrow zone in liquid condition and solidifies as the heated zone travels away from the precipitation point resulting in a monocrystalline semiconductor layer independently of the lattice structure of the carrier.

The method of our invention has the further advantage that, due to the different distribution coefficient of the impurities in the liquid and in the solid phases respectively, an additional purifying effect takes place.

According to another, preferred feature of the invention, we maintain during cooling of the precipitated semiconductor layer a temperature gradient of such orientation that the layer surface facing away from the carrier will freeze first. This still further improves the independence of the crystal growth from the crystal structure or constitution of the material used as carrier.

For further explaining the invention, reference will be made to the embodiments illustrated by way of example on the accompanying drawings in which.

Figure 1:
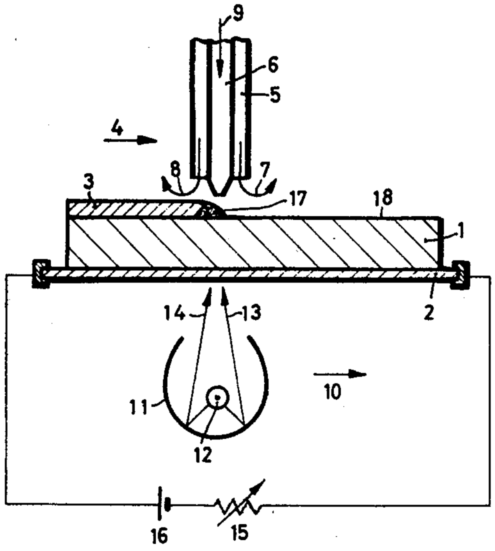
FIG. 1 shows in vertical section a device for producing a semiconductor layer by pyrolytic precipitation from a gaseous compound supplied with the aid of a nozzle.

The device illustrated in FIG. 1 comprises a carrier plate 1 of quartz, for example, which is placed upon a supporting sheet 2 of metal. Two opposite edges of the metal are clamped or otherwise attached to respective holders *2a*, *2b* which serve as terminals and are connected through a controllable resistor 15 with a voltage source 16. During operation the supporting sheet 2 is heated by the electric current to such a high temperature that the entire surface 18 of the carrier 1 is at an elevated temperature which, however, is below the melting point of the semiconductor substance, for example silicon, to be precipitated.

The nozzle structure 6 consisting, for example, of quartz, extends transversely over the entire width of the carrier 1 and in this direction has a knife-edge type orifice through which the reaction gas mixture is supplied in the direction of the arrow 9. The nozzle structure 6 is displaced in the direction of the arrow 4 starting from the left end of the carrier 1 and passing along the entire length of the carrier to its right-hand end.

For the precipitation of silicon, the reaction gas mixture consists, for example, of silicochloroform ($SiHCl_3$) and hydrogen and is blown through the slit nozzle 6 onto the carrier 1. The silicon compound to be dissociated may also consist of a silicon hydrogen compound such as $SiH_4$ or another gaseous silicon halogenide such as $SiCl_4$ or $SiI_4$.

The nozzle 6 is surrounded by a jacket 5 preferably also consisting of quartz through which an inert gas, for example nitrogen, is blown against the carrier 1 in the direction indicated by arrows 7 and 8. At the location at which the reaction gas mixture impinges upon the carrier, the carrier is heated to a temperature which is equal to or greater than the melting point of the semiconductor substance to be precipitated. At this location, extending across the carrier, perpendicularly to the plane of illustration, the semiconductor material (Si) is then precipitated in liquid constitution. The nozzle 6 and the heating device 11, 12 are displaced at the same speed in the direction of the arrows 4 and 10 respectively. During the uniform travel, the silicon crystallizes in monocrystalline form out of the melt and a monocrystalline silicon layer 3 is formed with a bulging, traveling front portion 17.

Figure 4:
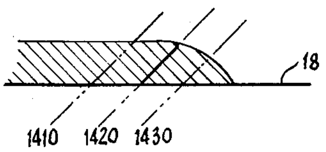
FIG. 4 shows in enlarged vertical section the temperature gradients of the deposited layer.

The thickness of the precipitated layer depends upon the speed at which the nozzle and the heater device are jointly passed along the carrier. Due to the fact that the entire carrier is heated by the heated supporting sheet 2, a temperature gradient is maintained during cooling of the precipitated layer with the effect that the uppermost parts of the layer 3 will solidify first so that the freezing front between the liquid and solid portions in the layer extends at a slant to the surface plane of the carrier 1 (see FIG. 4). This temperature gradient can be increased, for example, by a cooling gas current which is directed onto the last precipitated zone of the layer 3 through a separate nozzle (not shown) or through the jacket 5 of the above-described precipitation nozzle 6. When employing such an additional cooling flow of gas, the heating of the entire carrier by means of its support may be omitted, and only the narrow zone need be heated to the necessary high temperature during the pyrolytic precipitation.

Figure 2:
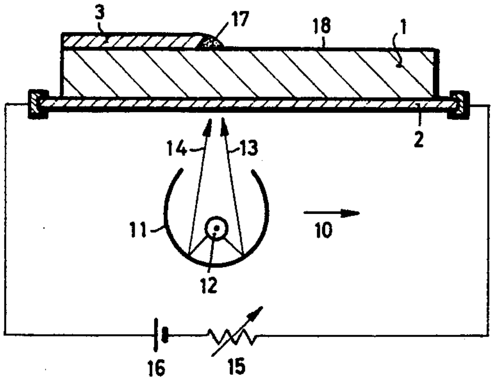
FIG. 2 shows in vertical section a device for precipitating a semiconductor layer from a gaseous environment containing a gaseous compound of the semiconductor material to be precipitated.

According to the embodiment illustrated in FIG. 2, the carrier 1, heated by means of its supporting sheet 2 in the above-described manner, is located in an atmosphere consisting of the reaction gas mixture, for example of silicochloroform and hydrogen, contained in a suitable processing vessel in which the illustrated device is mounted. The carrier 1 is kept below the dissociation temperature of the reaction gas mixture. By passing the heating device 11, 12 along the carrier 1 in the direction of the arrow 10, a narrow transverse zone of the carrier is heated to a temperature above the dissociation temperature and above the melting point of the precipitated semiconductor substance, so that in this narrow zone the semiconductor substance is precipitated in liquid form. As the heating device passes along the carrier, the semiconductor substance, such as silicon, crystallizes out of the melt in monocrystalline form. The temperature gradient can be increased by using a cooling flow of gas, as described above, or can be produced solely by heating the narrow zone when the entire supporting sheet 2 is not heated and the heating is effected only by heating device 11, 12 for causing dissociation and precipitation in the narrow melting zone.

The heating device illustrated in FIGS. 1 and 2 by way of example comprises a heat source 12, such as an incandescent infrared radiator which is mounted within a concave reflector 11 so that the heat rays, of which two are schematically shown and denoted by 13, 14, are concentrated to a narrow transverse zone of the carrier in order to heat the carrier up to the desired temperature. The heating of the narrow zone may also be effected by other heating means, for example by maintaining an electric gas discharge between the carrier or the supporting sheet and an electrode passing along the surface of the carrier or supporting sheet.

Heating the supporting sheet 2 of the carrier 1 serves to heat the carrier 1 to a temperature below the melting point of the semiconductor substance to be precipitated, for example silicon. The carrier 1 and the supporting sheet 2 consist of materials whose melting points are above the melting temperature of silicon. The temperature in the zone of additional heating is to be so chosen that the precipitated semiconductor substance will melt in the zone of additional heating while on the other hand the carrier 1 and the supporting sheet 2 remain solid. Consequently, the temperature in the zone of additional heating must have a value between the melting point of the semiconductor substance to be precipitated (for example silicon) and the melting temperatures of the bodies 1 and 2. It is advisable to exceed the melting point of silicon (1420° C.) only slightly, no more than approximately 50° C., if the longitudinal dimension of the entire device is in the order of a few centimeters. The simplest way of operation is to first heat the carrier 1 by the supporting sheet 2 and to then direct the gas flow from nozzle 6 against the end of the carrier. When the temperature of the carrier exceeds a given value, which depends upon the choice of the reaction gas, then precipitation of the semiconductor substance from the reaction gas takes place. The semiconductor compounds suitable for such purposes generally result in precipitation of semiconductor substance even if the temperature of the carrier 1 is below the melting point of the semiconductor substance, as long as the carrier temperature is near the melting point of the carrier. This precipitation is always to be in solid condition as long as the carrier is not additionally heated by the heat source 11, 12. This can be used as a criterion for the correct adjustment of the carrier temperature by the basic heating means. On the other hand, the additional heating zone, furnished from the heat source 11, 12, effects liquefication of the precipitated silicon which, however, is to freeze when the heat source 11, 12 is either switched off or is moved away along the carrier. The closer the temperature, produced by the heater 2, is to the melting point of the precipitated semiconductor substance, the less power need be supplied by the additional heat source 11, 12, in order to produce a melting zone in the precipitated material. It is therefore preferable to keep the temperature of the carrier for precipitation of silicon from the base source at about 1300 to 1400° C., and the temperature of the additional heating at about 1450° C.

The travel speed of the zone of additional heating, as well as the simultaneous travel of the nozzle 6, depend mainly upon the thickness of the monocrystalline semiconductor layer being produced. A faster travel speed results in thinner layers than a slower travel speed, because then the substance precipitated from the reaction gas per unit of time is distributed over a greater area of the carrier surface. Conversely, at a given travel speed of the heating zone and the nozzle 6, more semiconductor substance per unit of area is precipitated, if the dissociation point of the chosen reaction gas is lower and if its semiconductor substance content is higher.

For good monocrystalline solidification of the silicon precipitated and molten in the zone of additional heating, it is advisable to keep the travel speed of the heating zone in the range of about 1 to about 5 mm. per minute. Then a gas flow, issuing from a slit nozzle of about 0.10 mm. width of the slit at a velocity of 0.1 liter per minute and consisting of about 5 volume percent $SiHCl_3$ and 95 volume percent hydrogen, results in a layer of monocrystalline silicon having a thickness between $10^{-2}$ and $5\cdot10^{-1}$ mm.

For precipitation of germanium or other semiconductor substances analogous viewpoint apply. The zone-travel speeds for germanium and $A_{III}B_V$ compounds are preferably likewise in the order of a few millimeters per minute.

Figure 3:
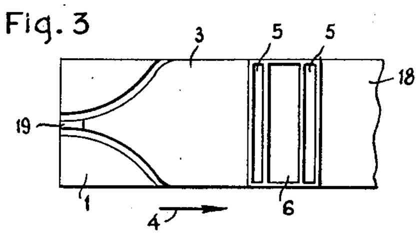
FIG. 3 shows in plan view growth of a semiconducting layer initiating from a seed crystal.

FIG. 3 shows the carrier as seen from above. Starting from a narrow seed crystal 19, the semiconductor layer 3 widens in fan shape and covers during continued growth substantially the entire width of the carrier surface 18.

The lower limit of the zone-traveling speed along the carrier is determined essentially by the heating-up rate required by the carrier, for attaining or exceeding the melting temperature of the precipitating semiconductor substance by operation of the heating device.

The method according to the invention is also applicable for the production of other semiconductor substances, for example of monocrystalline germanium layers, or of layers consisting of semiconducting $A_{III}B_V$ compounds, or of layers consisting of a germanium-silicon alloy. Illustrative of the $A_{III}B_V$ compounds, GaAs can be produced using a gaseous mixture of $GaCl_3$, $H_2$ and As.

The method can further be employed by producing doped monocrystalline semiconductor layers by adding doping substances to the reaction gas mixture. For the production of p-n junctions, the carrier can be prepared with a doping substance which diffuses into the precipitated layer and thereby reverses its type of conductance in an adjacent region. For this purpose, a tantalum or quartz carrier treated with boron may be used, for example. The carrier may be treated as described in copending application Serial No. 155,691, filed on even date herewith. When, for example, a carrier of quartz is used, the carrier can be precharged with boron by tempering in a boron-containing atmosphere, for example in $B_2O_3$ vapor or $BCl_3$ vapor. When the processing temperature, the processing time, and the content of the boron-containing atmosphere used for precharging a second group of the quartz carriers are adjusted to the same values which were used to precharge a first group of quartz carriers of the same constitution, then boron content of both groups of quartz carriers will assume the same value. When, thereafter, elemental silicon is precipitated according to the invention upon a carrier thus prepared, boron diffuses from the carrier into the precipitated silicon during the precipitation process. The diffusion can be augmented by subsequently subjecting the precipitated silicon to tempering. By using carrier bodies prepared in the same manner, using the same precipitation temperatures and the same precipitation periods of time and performing a subsequent treatment in the same manner, the doping degree of the resulting silicon layers can be kept uniform. It is advisable to use one of the produced silicon layers of a group or batch for performing pre-tests in order to definitely ascertain the processing temperatures and processing periods required for obtaining a given degree of doping.

*Example*

The carriers consisting of quartz are tempered at about 800° C. in an atmosphere of $B_2O_3$ vapor under a pressure of 1 mm. Hg. The borated carriers are thereafter used for precipitating thereupon a layer of silicon from a reaction gas consisting of about 5 percent $SiHCl_3$ by volume and 95 percent hydrogen by volume, the reaction gas issuing from a slit nozzle of about 1.1 mm. width of the slit-like nozzle orifice at a rate of 0.1 liter per minute. The carrier with the precipitated semiconductor layer is heated to a temperature below its melting point so that the doping substance, contained in the carrier, can diffuse into the semiconductor layer. The closer the processing temperature is to the melting point of the precipitated semiconductor substance, the higher is the rate of diffusion and hence the shorter diffusion time required. Thus, for example, a diffusion time of about 15 hours is necessary in order to dope a precipitated silicon layer of about 0.15 mm. thickness with boron at 1100 to 1200° C. The temperature required for diffusion treatment is preferably provided by the heater 12 which can be adjusted in the same manner as for performing the precipitation of the semiconductor substance to be produced.

Doping substances can also be alloyed or diffused into the top side of the precipitated layer, thus producing further p-n junctions. By subdividing the carrier and contacting the semiconductor layers, individual semiconductor components can be produced for use in the manufacture of electronic semiconductor devices such as rectifier diodes, transistors or solar elements. In cases where the above-mentioned carrier consists of metal, this metal may also serve as an electric terminal or contact in the semiconductor component being produced.

Obviously, many modifications and variations of the present invention are possible in the light of the above teachings. It is therefore to be understood that within the scope of the appended claims, the invention may be practiced otherwise than as specifically described.

We claim:

1. A method for producing monocrystalline, particularly thin, semiconducting layers by thermal decomposition of a gaseous compound of the semiconductor substance and precipitation of the semiconductor substance onto a plate-shaped carrier having a melting point above that of the semiconductor substance, which comprises using a carrier of a material having a constitution different from the lattice structure of the semiconductor substance being precipitated, heating a narrow zone of said carrier to a temperature above the melting point of said semiconductor to be precipitated, dissociating a gaseous semiconductor compound of said semiconductor substance in said narrow zone of said carrier thereby precipitating a liquid semiconductor layer on said carrier in said narrow zone, maintaining a temperature gradient during cooling of said liquid semiconductor layer whereby the horizontal semiconductor surface farthest from said carrier solidifies first, and passing said zone along said carrier.

2. A method for producing monocrystalline, particularly thin, semiconducting layers by thermal decomposition of a gaseous compound of the semiconductor substance and precipitation of the semiconductor substance onto a plate-shaped carrier, which comprises using a carrier of quartz, heating a narrow zone of said quartz carrier to a temperature above the melting point of said semiconductor to be precipitated, dissociating a gaseous semiconductor compound of said semiconductor substance in said narrow zone of said quartz carrier thereby precipitating a liquid semiconductor layer on said carrier in said narrow zone, maintaining a temperature gradient during cooling of said liquid semiconductor layer whereby the horizontal semiconductor surface farthest from said carrier solidifies first, and passing said zone along said carrier.

3. A method for producing monocrystalline, particularly thin, semiconducting layers by thermal decomposition of a gaseous compound of the semiconductor substance and precipitation of the semiconductor substance onto a plate-shaped carrier, which comprises using a ceramic carrier, said carrier having a lattice structure differing from that of the semiconductor being precipitated, heating a narrow zone of said carrier to a temperature above the melting point of said semiconductor to be precipitated, dissociating a gaseous semiconductor compound of said semiconductor substance in said narrow zone of said carrier thereby precipitating a liquid semiconductor layer on said carrier in said narrow zone, maintaining a temperature gradient during cooling of said liquid semiconductor layer whereby the horizontal semiconductor surface farthest remote from said carrier solidifies first, and passing said zone along said carrier.

4. A method for producing monocrystalline, particularly thin, semiconducting layers by thermal decomposition of a gaseous compound of the semiconductor substance and precipitation of the semiconductor substance onto a plate-shaped carrier, which comprises using a carrier of metal having a melting point above that of the semiconductor substance, heating a narrow zone of said metal carrier to a temperature above the melting point of said semiconductor to be precipitated, dissociating a gaseous semiconductor compound of said semiconductor substance in said narrow zone of said metal carrier thereby precipitating a liquid semiconductor layer on said carrier in said narrow zone, maintaining a temperature gradient during cooling of said liquid semiconductor layer whereby the horizontal semiconductor surface remote from said carrier solidifies first, and passing said zone along said carrier.

5. A method for producing monocrystalline, particularly thin, semiconducting layers by thermal decomposition of a gaseous compound of the semiconductor substance and precipitation of the semiconductor substance onto a plate-shaped carrier, which comprises using a carrier of glass, heating a narrow zone of said glass carrier to a temperature above the melting point of said semiconductor to be precipitated, dissociating a gaseous semiconductor compound of said semiconductor substance in said narrow zone of said glass carrier thereby precipitating a liquid semiconductor layer on said carrier in said narrow zone, maintaining a temperature gradient during cooling of said liquid semiconductor layer whereby the horizontal semiconductor surface farthest from said carrier solidifies first, and passing said zone along said carrier.

6. A method for producing monocrystalline, particularly thin, semiconducting layers by thermal decomposition of a gaseous compound of the semiconductor substance and precipitation of the semiconductor substance onto a plate-shaped carrier having a melting point above that of the semiconductor substance, which comprises using a carrier of a material having a constitution different from the lattice structure of the semiconductor being precipitated, heating a narrow zone of said carrier to a temperature above the melting point of said semiconductor to be precipitated, introducing a gaseous compound of said semiconductor substance, through a narrow opening, against the upper surface of said carrier at said zone, said gaseous compound dissociating and depositing a liquid semiconductor layer on said narrow zone of said carrier, maintaining a temperature gradient during cooling of said liquid semiconductor layer whereby the horizontal semiconductor surface remote from said carrier solidifies first, and passing said zone along said carrier.

7. A method for producing monocrystalline, particularly thin, semiconducting layers by thermal decomposition of a gaseous compound of the semiconductor substance and precipitation of the semiconductor substance onto a plate-shaped carrier having a melting point above that of the semiconductor substance, which comprises using a carrier of a material having a constitution different from the lattice structure of the semiconductor being precipitated, heating a narrow zone of said carrier to a temperature above the melting point of said semiconductor to be precipitated, introducing a gaseous compound of said semiconductor substance admixed with doping agent through a narrow opening, against the upper surface of said carrier at said zone, said gaseous compound dissociating and depositing a doped liquid semiconductor layer on said narrow zone of said carrier, maintaining a temperature gradient during cooling of said liquid semiconductor layer whereby the horizontal semiconductor surface remote from said carrier solidifies first, and passing said zone along said carrier.

References Cited by the Examiner

UNITED STATES PATENTS

| | | | |
|---|---|---|---|
| 2,692,839 | 10/54 | Christensen et al. | 117—106 X |
| 2,849,343 | 8/58 | Kroger et al. | 148—175 |
| 2,880,117 | 3/59 | Hanlet | 117—200 |
| 2,902,350 | 9/59 | Jenny et al. | 23—301 |
| 2,999,735 | 9/61 | Reuschel | 23—223.5 |
| 3,072,507 | 1/63 | Anderson et al. | 117—200 X |

RICHARD D. NEVIUS, *Primary Examiner.*

MAURICE A. BRINDISI, *Examiner.*